(12) United States Patent
Read et al.

(10) Patent No.: US 12,312,724 B2
(45) Date of Patent: *May 27, 2025

(54) GRADIENT TOW RIBBONIZING FOR CHEMICAL VAPOR INFILTRATION CERAMIC MATRIX COMPOSITES

(71) Applicant: Raytheon Technologies Corporation, Farmington, CT (US)

(72) Inventors: Kathryn S. Read, Marlborough, CT (US); Brendan M. Lenz, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/645,194

(22) Filed: Dec. 20, 2021

(65) Prior Publication Data
US 2023/0193541 A1  Jun. 22, 2023

(51) Int. Cl.
*D06B 1/04* (2006.01)
*C04B 35/80* (2006.01)

(52) U.S. Cl.
CPC .............. *D06B 1/04* (2013.01); *C04B 35/80* (2013.01); *C04B 2235/614* (2013.01); *C04B 2235/786* (2013.01); *D10B 2101/08* (2013.01)

(58) Field of Classification Search
CPC ...... B32B 18/00; D03D 15/242; D03D 15/43; D03D 15/46; D04C 1/02; D02J 1/18; D10B 2101/08; D10B 2101/16; D10B 2401/10; D10B 2505/02
See application file for complete search history.

(56) References Cited

U.S. PATENT DOCUMENTS

| | | |
|---|---|---|
| 5,049,329 A | 9/1991 | Allaire et al. |
| 5,250,243 A | 10/1993 | Allaire et al. |
| 5,459,114 A | 10/1995 | Kaya et al. |
| 5,547,622 A | 8/1996 | Chalasani et al. |
| 5,732,748 A | 3/1998 | Aucagne et al. |
| 5,756,206 A | 5/1998 | Davies et al. |

(Continued)

FOREIGN PATENT DOCUMENTS

| | | |
|---|---|---|
| CN | 111058187 A | 4/2020 |
| DE | 102015209535 A1 | 11/2016 |

(Continued)

OTHER PUBLICATIONS

Extended European Search Report for EP Application No. 22212614.6, Dated Oct. 2, 2023, pp. 13.

(Continued)

*Primary Examiner* — Lynda Salvatore
(74) *Attorney, Agent, or Firm* — Kinney & Lange, P.A.

(57) ABSTRACT

A method of preparing a ceramic fabric and ceramic matrix composite components constructed from the ceramic fabric include transforming ceramic tows, or ceramic fabrics, to varying degrees from a first tow geometry to a second tow geometry, thereby reducing a first dimension of the ceramic tows and increasing a second dimension of the ceramic tows orthogonal to the first dimension. Plies constructed with flattened tows, or as-received tows, have various inter-tow pore sizes that are arranged with increasing inter-tow pore size towards exterior surfaces of the preform structure.

15 Claims, 5 Drawing Sheets

(56) References Cited

U.S. PATENT DOCUMENTS

| | | | |
|---|---|---|---|
| 6,585,842 | B1 | 7/2003 | Bompard et al. |
| 6,641,893 | B1 | 11/2003 | Suresh et al. |
| 7,837,914 | B2 | 11/2010 | Kostar et al. |
| 8,440,045 | B2 | 5/2013 | Bremmer et al. |
| 8,545,938 | B2 | 10/2013 | Schmidt et al. |
| 9,908,305 | B2 | 3/2018 | Chamberlain et al. |
| 10,822,281 | B2 | 11/2020 | She et al. |
| 10,829,418 | B2 | 11/2020 | Jackson et al. |
| 10,954,169 | B2 | 3/2021 | Droz et al. |
| 11,015,467 | B2 | 5/2021 | Read |
| 11,072,565 | B2 | 7/2021 | Weaver et al. |
| 12,017,379 | B2 * | 6/2024 | Read .................. D03D 15/46 |
| 2002/0022422 | A1 | 2/2002 | Waldrop, III et al. |
| 2002/0084558 | A1 | 7/2002 | Hanzawa et al. |
| 2005/0164578 | A1 | 7/2005 | Aldridge et al. |
| 2007/0096371 | A1 | 5/2007 | McGuigan et al. |
| 2007/0099527 | A1 | 5/2007 | Brun et al. |
| 2010/0119777 | A1 | 5/2010 | Merrill et al. |
| 2012/0074265 | A1 | 3/2012 | Hallander et al. |
| 2012/0237707 | A1 | 9/2012 | Beraud et al. |
| 2012/0301691 | A1 | 11/2012 | Charleux et al. |
| 2014/0099484 | A1 | 4/2014 | Roberts et al. |
| 2016/0186691 | A1 | 6/2016 | Charleux et al. |
| 2017/0015595 | A1 | 1/2017 | Weaver et al. |
| 2017/0348876 | A1 | 12/2017 | Lin et al. |
| 2018/0281228 | A1 | 10/2018 | Godon et al. |
| 2019/0048730 | A1 | 2/2019 | Subramanian et al. |
| 2019/0359531 | A1 | 11/2019 | Steffier et al. |
| 2019/0389171 | A1 | 12/2019 | Nelson |
| 2020/0078822 | A1 | 3/2020 | Khattab et al. |
| 2020/0385898 | A1 | 12/2020 | Chiu et al. |
| 2021/0239008 | A1 | 8/2021 | Read |
| 2021/0262353 | A1 | 8/2021 | McCaffrey et al. |
| 2023/0191656 | A1 * | 6/2023 | Read ................ D03D 1/00 264/173.1 |

FOREIGN PATENT DOCUMENTS

| | | |
|---|---|---|
| EP | 0302449 A2 | 2/1989 |
| EP | 0589286 A1 | 3/1994 |
| EP | 1215183 A1 | 6/2002 |
| EP | 3590906 A1 | 1/2020 |
| EP | 3650424 A1 | 5/2020 |
| EP | 4119709 A1 | 1/2023 |
| GB | 2252315 A | 8/1992 |
| JP | 2000096387 A | 4/2000 |
| JP | 2005290204 A | 10/2005 |
| JP | 2007332484 A | 12/2007 |
| WO | 9412708 A1 | 6/1994 |
| WO | 2010061139 A2 | 6/2010 |
| WO | 2021005282 A2 | 1/2021 |

OTHER PUBLICATIONS

Extended European Search Report for EP Application No. 22205639.2, dated Mar. 24, 2023, 7 pages.
Extended European Search Report for EP Application No. 22212559.3, May 10, 2023, pp. 8.
http://www.mschangart.com/studio-art-honors/ceramic-bowl (Year: 2014).
https://www.sciencedirect.com/science/article/pii/S0263822315000914#f0005 (Year: 2015).
Extended European Search Report for EP Application No. 22212549.4, Dated Jun. 7, 2023, pp. 13.
Partial European Search Report for EP Application No. 22212614.6, Dated Jun. 30, 2023, pp. 14.
International Preliminary Report on Patentability for PCT Application No. PCT/US2022/053178, Dated Jun. 20, 2024, pp. 5.
International Search Report and Written Opinion for PCT Application No. PCT/US2022/053178, Dated May 2, 2023, pp. 9.
First Communication Pursuant to Article 94(3) EPC for EP Application No. 22205639.2, Dated Jan. 10, 2025, pp. 3.
First Communication Pursuant to Article 94(3) EPC for EP Application No. 22212559.3, Dated Jan. 10, 2025, pp. 6.

* cited by examiner

GRADIENT TOW RIBBONIZING FOR CHEMICAL VAPOR INFILTRATION CERAMIC MATRIX COMPOSITES

BACKGROUND

The present invention relates to ceramic matrix composites, and more particularly to the preparation of woven ceramic fabrics for use in ceramic matrix composites.

The microstructure of a composite component is dictated, in part, by the fiber tow structure. In the case of ceramic matrix composites, the microstructure of the tows also dictates the way the matrix is deposited during chemical vapor infiltration. The microstructure has a default bimodal pore distribution with intra- and inter-tow porosity or pore size, with inter-tow porosity typically exceeding intra-tow porosity. Controlling a microstructure distribution within the preform structure is critical for enabling a wider range of design solutions for gas turbine engine components.

SUMMARY

A method of preparing a ceramic fabric for use in a ceramic matrix composite in accordance with an exemplary embodiment of this disclosure includes transforming a first ceramic tow from a first tow geometry to a second tow geometry, thereby reducing a first dimension of the first ceramic tow and increasing a second dimension of the first ceramic tow orthogonal to the first dimension to produce a first flattened ceramic tow. Weaving or braiding the first flattened ceramic tow forms a first ceramic fabric. A second ceramic tow having an untransformed or transformed tow geometry is woven or braided to form a second ceramic fabric. The method includes separating the first ceramic fabric into at least one first ply and separating the second ceramic fabric into at least one second ply. The method forms a preform structure by laying up the first ply and the second ply.

Another method of preparing a ceramic fabric for use in a ceramic matrix composite in accordance with another exemplary embodiment of this disclosure includes weaving or braiding a plurality of first ceramic tows to form a first ceramic fabric and weaving or braiding a plurality of second ceramic tows to form a second ceramic fabric, an average first inter-tow pore size of the first ceramic fabric and a second inter-tow pore size of the second ceramic fabric is between 30% and 55% of an average center-to-center spacing of the first ceramic tows and the second ceramic tows, respectively. The method includes transforming the first ceramic fabric from the first average inter-tow pore size to a third average inter-tow pore size by applying a first pressure to opposite sides of the first ceramic fabric in which the third average inter-tow pore size is less than 30% of the average center-to-center spacing of the first ceramic tows. The method includes separating the first ceramic fabric and into at least one first ply after transforming the first ceramic fabric and separating the second ceramic fabric into at least one second ply. The method forms a preform structure by laying up the first ply and the second ply.

A further embodiment of either of the foregoing methods can include arranging the first ply exterior to the second ply to form an increasing inter-tow pore size gradient towards the exterior surface of the preform structure.

DETAILED DESCRIPTION

As disclosed herein, a method for preparing a ceramic fabric for a ceramic matrix composite (CMC) component includes transforming a first ceramic tow to form a flattened ceramic tow and forming a first ceramic fabric by weaving or braiding the first flattened ceramic tow. A second ceramic fabric is formed by weaving or braiding a second, untransformed ceramic tow. The average inter-tow pore size of the first ceramic fabric is less than the average inter-tow pore size of the second ceramic fabric.

As disclosed herein, a ceramic matrix composite (CMC) is formed by ceramic plies with different average inter-tow pore sizes arranged to define an inter-tow pore size gradient. In an exemplary method, pressure applied to a ceramic tow flattens, or ribbonizes the tow proportional to the applied pressure. Weaving or braiding the flattened ceramic tow produces a ceramic fabric with a target average inter-tow pore size that can be tailored for a given fabric architecture by varying the pressure applied to the tow. In another exemplary method, ceramic fabric is formed by weaving or braiding untransformed, or as-received tows. Pressure applied to the ceramic fabric flattens, or ribbonizes the woven or braided tows and thereby reduces an average inter-tow pore size of the fabric. With each method, ceramic fabrics are constructed with tows flattened to different degrees, or constructed with untransformed tows, to achieve different average inter-tow pore sizes, which are separated into plies. During layup of the preform structure, plies are arranged in order of increasing average inter-tow pore size to achieve an increasing inter-tow pore size gradient from interior layers to exterior layers of the preform structure. Inter-tow pore size gradients compensate for a disparity interior ply and exterior ply matrix growth rates associated with chemical vapor infiltration (CVI) densification. Components produced by these methods achieve higher final density and improved interlaminar properties (i.e., interlaminar tensile strength, interlaminar shear strength, and interlaminar thermal conductivity).

Figure 1:
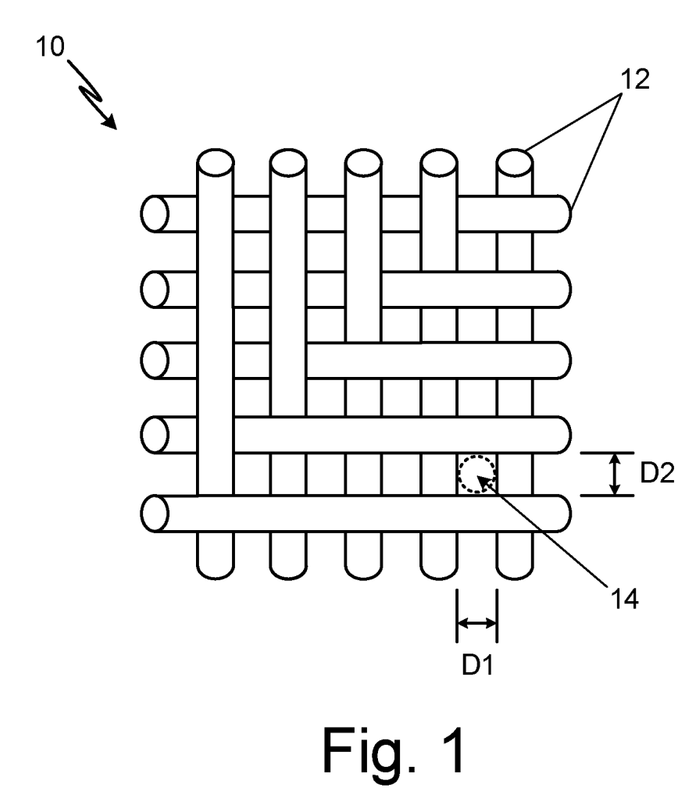
FIG. 1 is a simplified illustration of a ceramic fabric constructed using as-received ceramic tows.

FIG. 1 is a simplified version of woven fabric sheet 10 constructed with standard, as-received ceramic tows 12. Sheet 10 is formed from warp and weft (i.e., perpendicular) tows 12 which can be arranged in various woven architectures such as plain, harness (e.g., 3, 5, 8, etc.), twill, or non-symmetric to name a few non-limiting examples. Alternatively, sheet 10 can form braided layer 10 in which tows 12 have a braided architecture. Each tow 12, as manufactured, can be a bundle of silicon carbide filaments or another suitable ceramic. Sheet 10 can exhibit inter-tow spacing defined by the distances D1 between adjacent warp tows and D2 between adjacent weft tows (i.e., end-to-end spacing). The particular spacing between two adjacent warp or weft tows 12 can be generally uniform along the length of the respective tows 12, or can vary along the length of the respective tows 12. Variances typically arise from manufacturing imperfections. A combination of generally uniform and varied inter-tow spacing within sheet 10 is also possible.

Sheet 10 further includes pores 14 at least partially defined by the distance D1 between adjacent warp tows 12 and the distance D2 between adjacent weft tows 12. Distances D1 or D2 could also represent a diameter in rounded pores 14 (represented in FIG. 1 by a dashed circular line). Pores 14 can be three dimensional with additional dimensions generally orthogonal to D1 and/or D2 (not shown). Depending on the particular woven architecture of sheet 10, D1 can be generally equal to D2 as shown, but D1 can also be greater than D2, and vice versa. In the embodiment shown, the average size of D1 and/or D2 can be between 400 to 1500 microns. It should be understood that sheet 10 can include a distribution of pore 14 dimensions (e.g., ranging from 400 to 1500 microns) and shapes (e.g., both rounded and straight-edged), because of fabric deformation and lack of straightness of tows 12. Woven patterns may have from 10 picks per inch (or ends per inch) to 16 picks per inch (or ends per inch) while braid patterns can have from 5 plaits per inch to 12 plaits per inch.

Figure 2A:
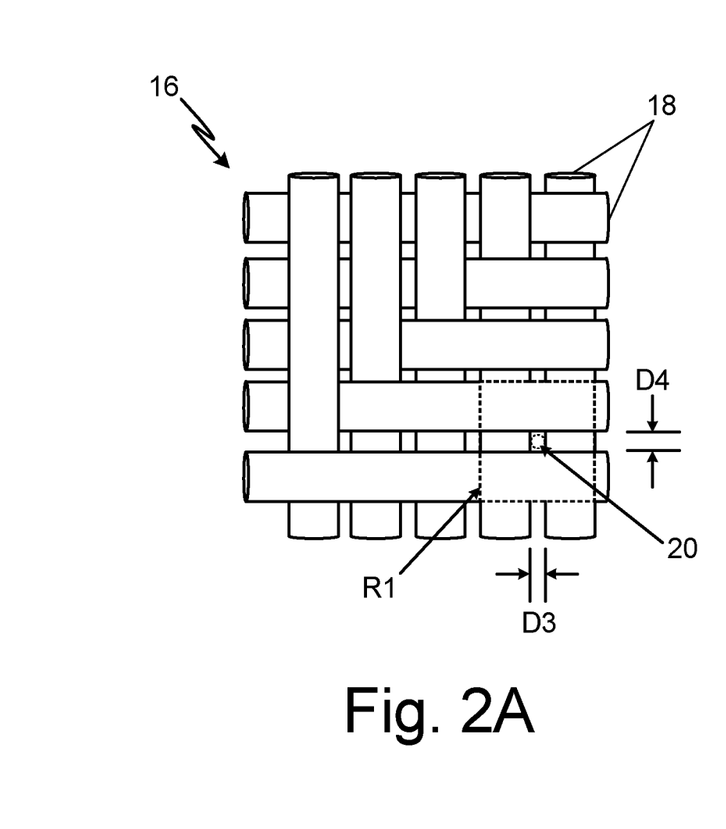
FIG. 2A and FIG. 2B are simplified illustrations of a ceramic fabric constructed using transformed ceramic tows.
Figure 2B:
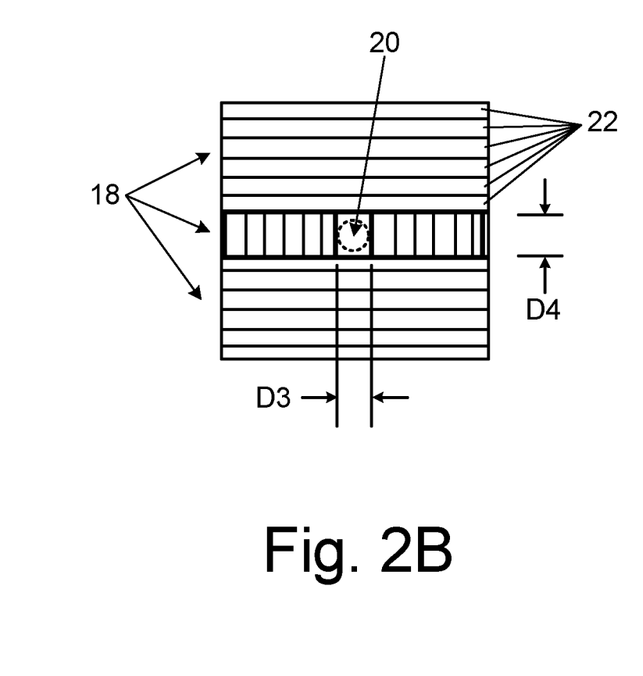

It can be desirable to reduce inter-tow spacing and the size of pores 14 while modifying pore distribution within sheet 10. FIG. 2A is a simplified illustration of woven fabric sheet 16. FIG. 2B is an enlarged view of region R1 of sheet 16. Sheet 16 represents sheet 10 after transformation of warp and weft tows 12 into flattened or ribbonized tows 18 and, optionally, into subtows 22. As used herein a "subtow" refers to a grouping of a subset of filaments from a parent tow 12 or a transformed parent tow 18 as a result of processing parent sheet 16 or parent tow 18, discussed in greater detail below. If constructed from subtows 22, sheet 16 can be referred to as a separated sheet. It can also be appropriate to refer to a separated sheet as a split or divided sheet.

Sheet 16 includes pores 20 at least partially defined by the distance D3 between adjacent warp tows 18 and the distance D4 between adjacent weft tows 18. Similar to sheet 10, distances D3 and D4 of pores 20 can represent a diameter of rounded pores 20 (represented in FIGS. 2A and 2B as a dashed circular line). Pores 20 are defined by equal, or unequal, distances D3 and D4 depending on the woven architecture of sheet 16. An average size of D3 and/or D4 can be between 50 microns and 1500 microns. In a particular embodiment, the average inter-tow pore size, as expressed by D3 and D4, can be between 50 microns and 800 microns. In each embodiment, the picks-per-inch (or ends-per-inch) of sheet 16 is between 10 and 16.

The warp and weft tows 18 used to construct sheet 16 have been flattened or ribbonized, and in some instances, separated into subtows 22. As such, a dimension of each tow 18, or subtow 22, measured in a plane normal to a longitudinal direction of the filaments is reduced under application of compressive pressure, producing a corresponding increase in a tow dimension orthogonal to the reduced dimension of the tow.

The degree to which tows 18 are flattened or ribbonized is proportional to a compressive pressure applied to an as-received tow. By flattening or ribbonizing tows 18, a flattened dimension of tows 18 can be as little as 35% of a nominal, as-received dimension of tow 12. The corresponding dimension of tow 18 orthogonal to the flattened dimension can be up to 250% of the nominal, as-received dimension of tow 12. The reduction in tow thickness is inversely proportional to the corresponding increase in tow width. Table 1 describes potential tow width increase as a function of tow thickness reduction following flattening or ribbonization techniques described herein. Other intermediate examples are possible, the flattened dimension of tow 18 and the corresponding increase of tow 18 in a direction orthogonal to the flattened dimension vary in proportion to the applied compressive pressure.

TABLE 1

Exemplary tow thickness reduction and tow width increase

| Tow thickness as percentage of as-received tow dimension | Tow width as percentage of as-received tow dimension |
|---|---|
| 85% | 113% to 123% |
| 71% | 136% to 146% |
| 62% | 156% to 166% |
| 45% | 217% to 227% |
| 35% | 240% to 250% |

Figure 3:
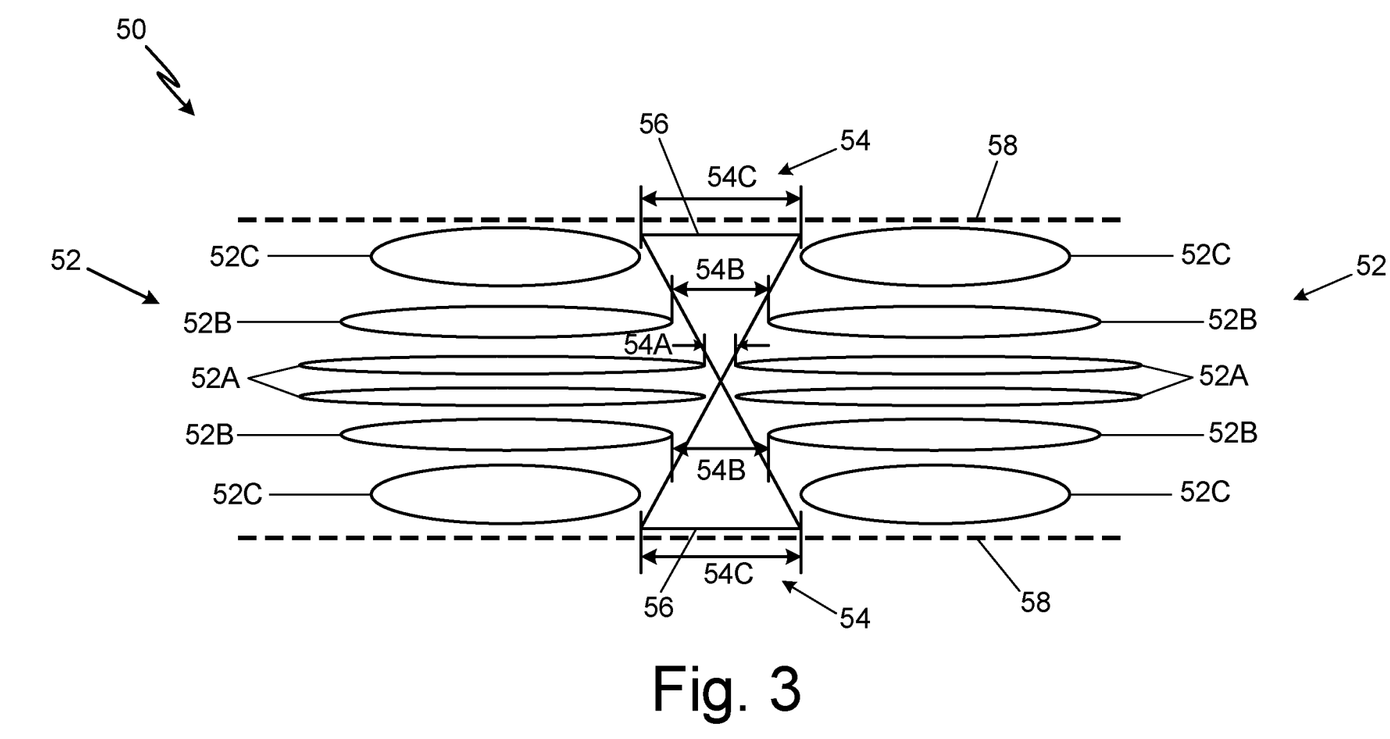
FIG. 3 is a schematic cross-section of a preform structure arranged with an inter-tow pore size gradient.

FIG. 3 is a simplified illustration of preform structure 50 constructed from multiple plies 52, each ply layer separated from a woven ceramic sheet 10, a braided ceramic layer, or transformed sheet 16. Within each layer, the ply architecture can be tailored to achieve a particular average inter-tow pore size 54 and/or average planar porosity such that preform structure 50 has inter-tow pore size gradient 56 from the most interior plies to the most exterior plies. For a ply with a given architecture described, in part, by picks-per-inch (or plaits per inch), average inter-tow pore size 54 can be decreased by flattening (or ribbonizing) tows 18 to a greater degree relative to as-received tow 12.

As shown in FIG. 3, preform structure 50 can include interior plies 52A, intermediate plies 52B, and exterior plies 52C. In other embodiments, preform structure 50 can include fewer plies or more plies as needed. Plies 52A are arranged interior to intermediate plies 52B and exterior plies 52C such that plies 52A are located furthest inward from exterior surfaces 58 of preform structure 50. In some embodiments, interior plies 52A form a first zone located at or near a mid-plane between exterior surfaces of preform structure 50. Exterior plies 52C of a second zone form the exterior surface of preform structure 50. Plies 52B are interior to plies 52C and exterior to plies 52A to from a third, intermediate zone.

Inter-pore size gradient 56 defines an increasing average inter-tow pore size from the most interior plies (e.g., plies 52A) towards the most exterior plies (e.g., plies 52C). Interior plies 52A have minimum average inter-tow pore size 54A (or minimum average planar porosity). Exterior plies 52C have maximum average inter-tow pore size 54C (or maximum average planar porosity), and intermediate plies 52B have average inter-tow pore size 54B between minimum average inter-tow pore size 54A and the maximum average inter-tow pore size 54C. Gradient 56, described by a distribution of average inter-tow pore sizes (e.g., average inter-tow pore sizes 54A-54C), can be a linear or curvilinear distribution that increases from minimum inter-tow pore size 54A to maximum inter-tow pore size 54C. For each distribution, the average inter-tow pore size of the most interior ply layer is at least 50 microns. The average inter-tow pore size of each ply layer determined in proportion to the applied compressive pressure for a given ply architecture. Plies constructed from as-received or untransformed tows (e.g., exterior plies 52C) can also be used to vary the average inter-tow pore size.

Gradient 56 may also be described by a distribution of planar porosity of each ply layer or zone of plies. Planar porosity is the percentage of pore area to the total area of the ceramic fabric measured within a plane intersecting the ceramic fabric. Planar porosity within a ply (or zone of plies) can be determined within a plane intersecting the ply (or zone of plies) generally parallel to a longitudinal direction of tows within at least a portion of the ply (i.e., an inspection region). For an individual pore, the planar porosity is equal to the end-to-end tow spacing squared for a given ply divided by the center-to-center tow spacing squared of the ply. For the depicted three-ply architecture shown by FIG. 3, exemplary ranges for each of average inter-tow pore sizes 54A-54C and planar porosity are listed within Table 2 below.

TABLE 2

Exemplary average inter-tow pore size and planar porosity ranges

|  | Ave. inter-tow pore size 54 | Planar porosity |
| --- | --- | --- |
| Interior ply 52A | 50 to 500 microns | 0.2% to 10% |
| Intermediate ply 52B | 300 to 800 microns | 1.4% to 25% |
| Exterior ply 52C | 500 to 1500 microns | 4.0% to 90% |

Figure 4:
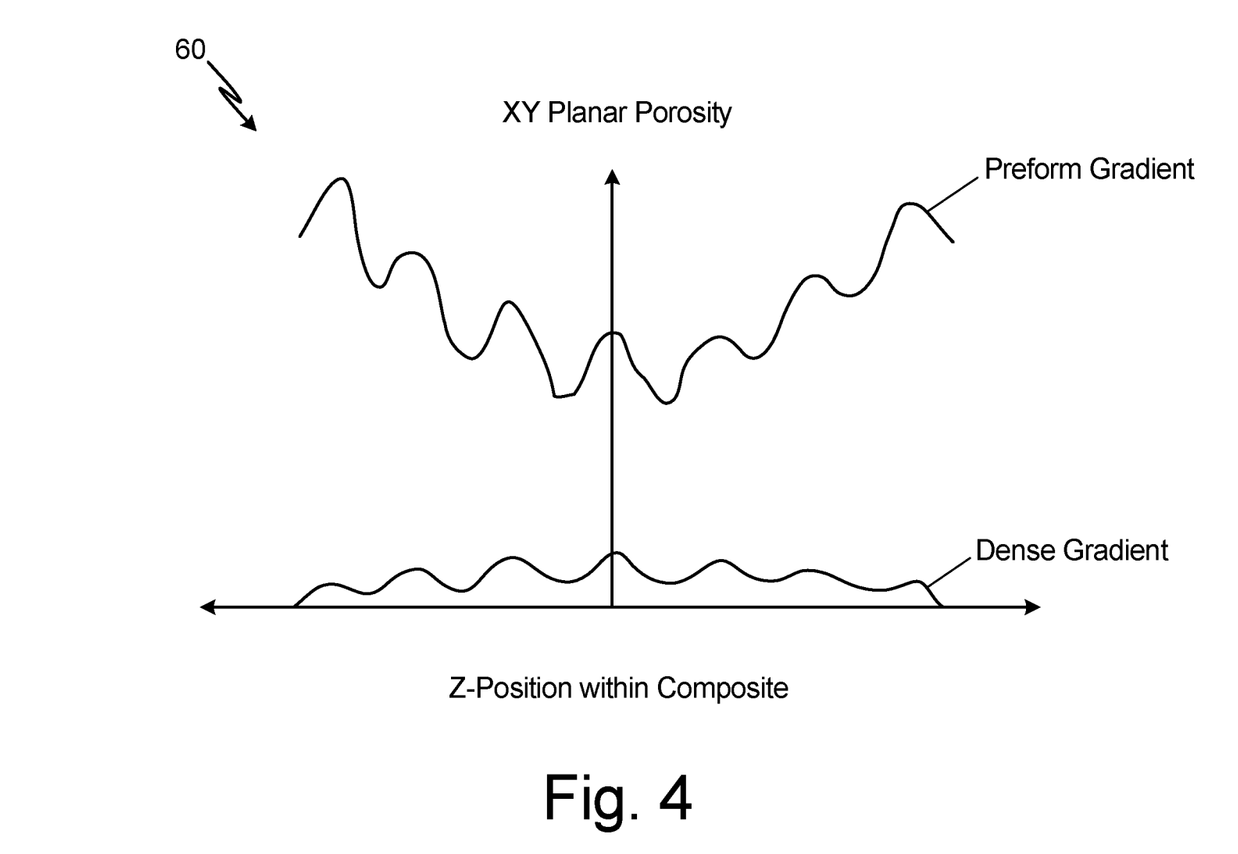
FIG. 4 is a graph illustrating a correlation between the microstructure and the planar porosity through the thickness of a preform structure before and after densification of a CMC component.

Gradient 56 can be observed using X-ray microtomography (or micro xCT) data. FIG. 4 is graph 60 illustrating the correlation of the microstructure and planar porosity through the thickness of preform structure 50 before and after densification of a CMC component. Graph 60 includes axes labelled "XY Planar Porosity" and "Z-position within Composite". This type of profile can be created through processing micro xCT data obtained on preform structure 50 before and after densification. The vertical axis (XY Planar Porosity) is the planar porosity of preform structure 50. The horizontal axis (Z-position within Composite) is the vertical position within the thickness of preform structure 50, with the mid-plane of preform structure 50 being at the center position on graph 60 (i.e., between adjacent inner layers 52A).

As shown in graph 60, the Preform Gradient line represents preform structure 50 having a gradient microstructure (FIG. 3) throughout the thickness of preform structure 50 before densification of preform structure 50. More specifically, the Preform Gradient line represents preform structure 50 having a lower planar average porosity (i.e., smaller average inter-tow pore size) at and near the mid-plane of preform structure 50 and higher planar average porosity (i.e., larger average inter-tow pore sizes) at and near exterior surface 58 of preform structure 50 (as shown in FIG. 3).

The Dense Gradient line represents preform structure 50 with a gradient microstructure after densification of preform structure 50. As shown by the Dense Gradient line, a CMC component with the gradient microstructure has a uniform density throughout the thickness of the CMC component after densification. Therefore, preform structure 50 with a gradient microstructure before densification results in a uniform density through the thickness of CMC component after densification, and thus increases the mechanical and thermal properties of CMC component, as compared to a component formed from a preform structure with a uniform microstructure before densification.

The gradient microstructure of preform structure 50 facilitates the uniform density after densification by having smaller pores 14 near the mid-plane (in some examples) of CMC components and larger pores 14 near exterior surface 58 of the component. During densification, the reactant vapors flow/travel through the network of porosity in preform structure 50 to create the matrix material. The larger pores 14 near exterior surface 58 allow the reactant vapors to easily travel through the network of pores 14 to the smaller pores 14 located near the mid-plane of preform structure 50. In contrast, having smaller pores 14 near an exterior surface of a preform structure could result in densification at its exterior surface before the reactant vapors can reach the mid-plane of the preform structure, known as canning off. Canning off results in a high porosity/non-uniform density CMC components and reduced mechanical and thermal properties of the CMC component. It is highly desirable to have a low porosity/uniform density CMC component for gas turbine engine components. The low porosity/uniform density the CMC component provides improved interlaminar properties such as interlaminar tensile strength (ILT), interlaminar shear strength (ILS), and increases thermal conductivity of the CMC component. As such, CMC components formed from preform structures 50 having a gradient microstructure is advantageous because it results in an optimized pore structure and a more uniform densification of the CMC component, as compared to a CMC component with a uniform microstructure.

Figure 5:
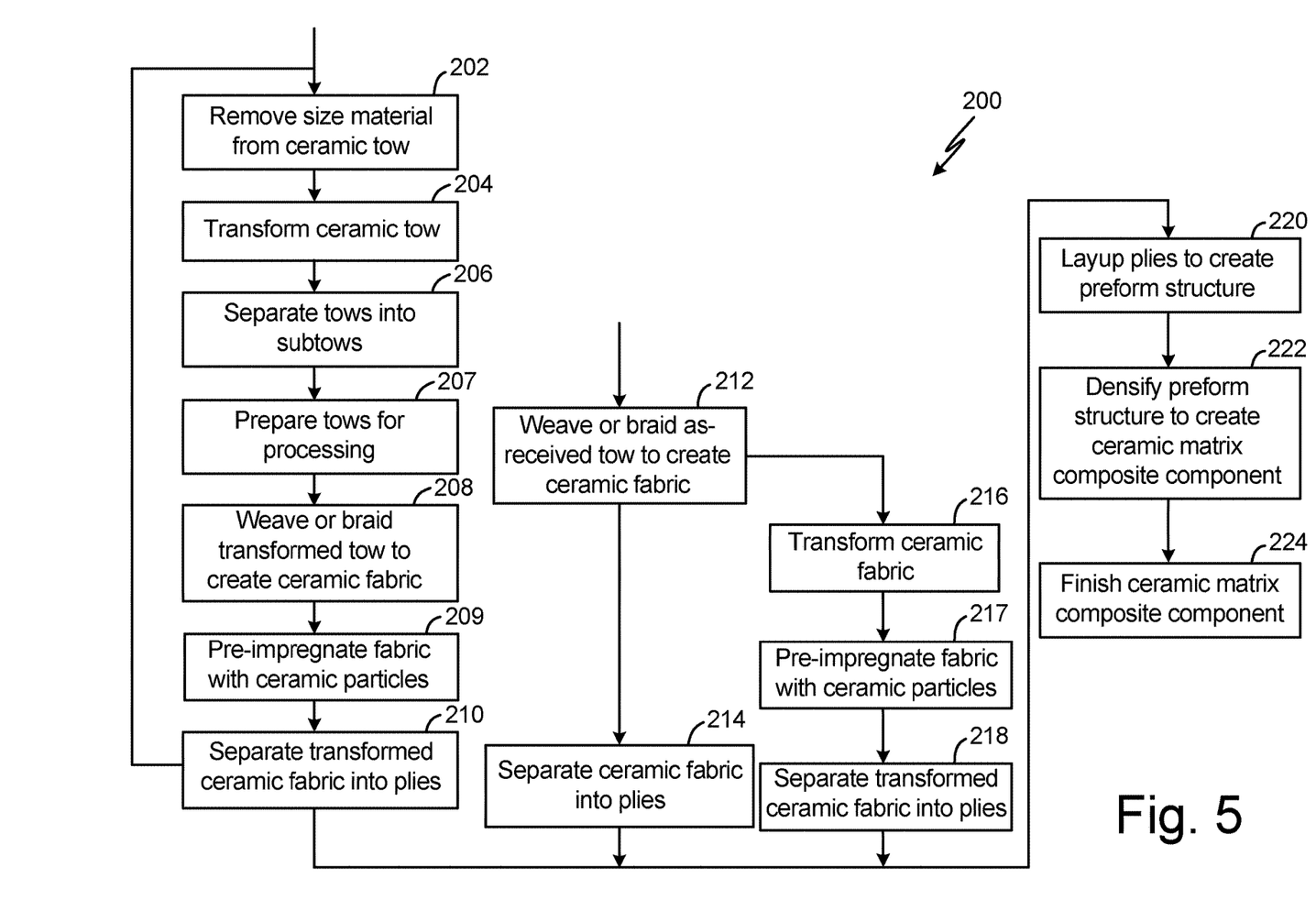
FIG. 5 is a flow chart describing a method of preparing ceramic tow for use in a ceramic matrix composite.

FIG. 5 is a flow chart describing method 200 for preparing a ceramic fabric for use in a ceramic matrix composite. Method 200 includes steps 202, 204, 206, 208, 210, 212, 214, 216, 218, 220, 222, and 224. The sequence depicted by FIG. 5 is for illustrative purposes only and is not meant to limit method 200 in any way as it is understood that the portions of the method can proceed in a different logical order, additional or intervening portions can be included, or described portions of the method can be divided into multiple portions, or described portions of the method can be omitted without detracting from the described below.

Creation of preform structure 50 begins by constructed one or more woven or braided ply layers using flattened (i.e., ribbonized) tows according to steps 202, 204, 206, 208, and 210. In step 202, size material is removed from as-received tows 12 in preparation for the transformation process in step 204. While sizing material deposited on the exterior of tow 12 protects tow 12 while weaving or braiding tow 12 into ceramic fabric, it also helps tow 12 retain its shape. Removing the size material allows filaments of tow 12 to spread more easily and thereby allows formation of tow 18 to occur more readily. Desizing processes are tailored to particular sizing materials and tow materials. For example, desizing can be achieved by heating tow 12, exposing tow 12 to a flame, or other oxidizing atmosphere, to burn off size material. Other processes include washing tow 12 in a heated fluid bath, such as water or ammonia, to break down or dissolve the sizing material.

After tow 12 is desized, compression of tow 12 transforms tow 12 into tow 18 in step 204, flatting or reducing a dimension of tow 18 along a direction of compression and widening tow 18 along a direction orthogonal to the direction of compression. Methods of applying compression include attaching tow 12 in tension across two or more rollers, which may be arranged along axis 52 of tow 12. Drawing tow 12 through the rollers applies pressure to tow 12 in opposing directions. Similarly, tow 12 may be fed through a die. An aperture at an inlet end of the die approximates the as-received shape of tow 12. At an outlet end of the die, the aperture shape transitions to a flattened form such that drawing tow 12 through the die applies compression to opposite sides of tow 12 while allowing tow 12 to expand in a direction orthogonal to the compressive pressure. In other compressive processes, opposing jets of air or fluid impinge upon tow 12 to apply the compressive pressure. In leu of gas or fluid pressure, vacuum pressure can be used to draw tow 12 against a surface to produced transformed tow 18.

The transformation process of step 204 produces tows 18 with reduced dimension along the direction of compressive pressure in proportion the applied pressure while increasing in dimension along a direction orthogonal to, and in proportion with, the applied compressive pressure. Along the direction of applied compressive pressure, the dimension of tow 18 can be at little as 35% of the as-received dimension of tow 12. Orthogonal to the applied compressive pressure, the dimension of tow 18 can be up to 250% of tow 12. The dimension reductions and corresponding orthogonal dimension increases of tow 18 relative to tow 12 are proportional to the applied compressive pressure.

Optionally, transformed tows 18 can be split into multiple subtows 22 prior to weaving or braiding ceramic fabric 16 in step 206. Methods for subtow creation include attaching tow 18 in tension across rollers equipped with spikes, ribs, or other protrusion or protrusions. As tow 18 passes over the roller, the protrusions impale tow 18 and thereby separate tow 18 into at least two subtows 22. Other methods for creating subtows 22 include drawing tow 18 through an air knife whereby an air jet impinges upon and separates tow 18 into two or more subtows 22. In some splitting operations, subtows 22 include 15% to 20% of the filaments from the parent tow. Splitting or separating tows 18 into subtows 22 may be used to further reduce or tailor the inter-tow pore size of ceramic fabric 16.

Additionally, in some embodiments of method 200, tows 18 can be prepared in step 207 prior to weaving or braiding ceramic fabric 16. Preparing can refer to the wetting of tow 18 with water or ethanol. Tow preparation can include applying a thin layer of size material that protects filaments of tow 18 and reduces filament breakage as well as retains a flattened shape of tow 18 during subsequent weaving, braiding, and other processing steps. Sizing materials include polyvinyl alcohol (PVA) or poly-vinyl butyral (PVB), which can be applied by spraying tows 18 or bathing tows 18 with the size material.

Weaving or braiding transformed tows 18, or subtows 22, produces ceramic fabric 16 in step 208. Weave patterns include harness satin, twill, and plain weaves while potential braid patterns include triaxial and biaxial braids. During the weaving or braiding process, tows 18 and/or subtows 22 remain untwisted. Weave patterns may have from 10 picks per inch (or ends per inch) to 16 picks per inch (or ends per inch), and braid patterns may have from 5 plaits per inch to 12 plaits per inch. The degree to which tow 18 is flattened or transformed relative to tow 12 is selected to achieve a desired average inter-tow pore size for a given the weave or braid architecture. For instance, an average inter-tow pore size can range from 50 microns to 1500 microns. Expressed as a percentage of the center-to-center tow spacing, the average inter-tow pore size can be 55% or less of the center-to-center tow spacing of ceramic fabric 16. In other embodiments, the average inter-tow pore size is 35% or less of the average center-to-center tow spacing of the fabric 16. Planar porosity of ceramic fabric 16 can range from 0.2% to 90%.

In step 209, ceramic fabric 16 can be pre-impregnated with a plurality of ceramic particles. Suitable ceramic particles can be formed from silicon carbide, boron carbide, hafnium oxide, hafnium boride, aluminum oxide, ytterbium oxide, or zirconium boride, to name a few non-limiting examples. Ceramic particles can be a homogeneous or heterogenous mixture of generally spherical, elongate, or otherwise irregularly shaped particles (e.g. short ceramic fibers). In one embodiment, ceramic particles can range in size from 10 microns to 100 microns, depending on the size of tows used to construct the ceramic fabric, among other variables. In another embodiment, ceramic particles can range in size from 40 microns to 70 microns.

At step 210, one or more sheets 16 can be separated (e.g., cut or split) into plies. Following creating of the initial ply layer constructed from transformed (i.e., flattened or ribbonized) tows. Steps 202, 204, 206, 208, and 210 can be repeated to create one or more additional ply layers. Additional ply layers can be constructed from tows 18 that have been transformed (i.e., flattened or ribbonized) to a greater or lesser degree than the initial ply layer to form a plurality of ply layers, each having a different average inter-tow pore size.

Each ply layer of preform structure 50 can be constructed from transformed (i.e., flattened or ribbonized) tows in accordance with steps 202, 204, 206, 208, and 210. In other instances, one or more of the ply layers can be constructed from as-received tows 12. In such embodiments, as-received tows 12 are woven or braided to produce a ceramic fabric in step 212. Similar to step 208, weave patterns include harness satin, twill, and plain weaves while potential braid patterns include triaxial and biaxial braids. Weave patterns may have from 10 picks per inch (or ends per inch) to 16 picks per inch (or ends per inch) while braid patterns may have from 5 plaits to 12 plaits per inch. In step 214, ceramic fabric constructed from as-received tows is separated into one or more plies.

Steps 216, 217, and 218 describe an alternative method of producing plies constructed with transformed tows. Initially, ceramic fabric constructed from as-received tows 12 can be produced in step 212. Subsequently, compressive pressure applied to the ceramic fabric transforms the woven or braided tows in step 216. Methods for applying pressure to the ceramic fabric include attaching the ceramic fabric in tension across rollers, two of which are arranged to apply opposing pressure to the fabric. As the ceramic fabric passes through the rollers, the as-received tows 12 within the ceramic fabric are flattened or ribbonized as described above. Other methods for applying compressive pressure to the ceramic fabric include opposing jets of air or fluid impinge upon the ceramic fabric to apply the compressive pressure. In leu of gas or fluid pressure, vacuum pressure can be used to draw ceramic fabric against a surface to produce a ceramic fabric constructed from transformed tows. In step 217, transformed ceramic fabric can be pre-impregnated with a plurality of ceramic particles as described by step 209. In step 218, the transformed ceramic fabric can be separated into one or more plies for constructed the preform structure.

In step 220, plies constructed from transformed tows 18 and, in some embodiments, plies constructed from as-received tows 12 are arranged into a desired two or three dimensional preform structure. Plies can be arranged to create a gradient of the average inter-tow pore size of the preform structures. In some embodiments, plies with the smallest average inter-tow pore size form the most interior layers of preform structure 50. The average inter-tow pore size of adjacent ply layers increases towards the most exterior ply layers, which have the largest average inter-tow pore size. In other embodiments, plies with the smallest average inter-tow pore size form the most exterior ply layers of preform structure 50. Adjacent to the exterior ply layer and proceeding inward, the average inter-tow pore size increases. In this instance, the most interior ply layer has the largest average inter-tow pore size. In other embodiments, some plies within the preform structure 50 maintain a constant average inter-tow pore size, with increasing or decreasing regions adjacent to plies defining a region of constant average inter-tow pore size.

Step 220 can further optionally include deposition of particles onto preform structure 50. The volume fraction of particles added to the preform structure can be relatively low (e.g., 1% to 15%). Such particles may be formed from a ceramic material (e.g., silicon carbide, boron carbide, hafnium oxide, hafnium boride, aluminum oxide, ytterbium oxide, or zirconium boride) and are intended to remain as part of the structure through matrix formation and help enhance matrix formation and fortify the resultant CMC. The average particle size suitable for method 200 can be between 20 microns to 100 microns. In some embodiments, the particle size within a preform structure ranges from 40 microns to 70 microns with respect to the average particle size. The particles can alternatively be formed from a fugitive material designed to be later decomposed by thermal or chemical means. Fugitive particles can be formed from a polymer material such as polyvinyl alcohol (PVA), polyvinyl butyral (PVB), or polymethyl methacrylate (PMMA). Fugitive particles can help maintain spacing of pores 20 and tows 18 (or subtows 22) of sheet 16, as well as inter-ply spacing during subsequent processing steps.

At step 222, the preform structure can undergo matrix formation and densification using a chemical vapor infiltration or deposition (CVI or CVD) process. During densification, the plies are infiltrated by reactant vapors, and a gaseous precursor deposits on the fibers. The matrix material can be a silicon carbide or other suitable ceramic material. Densification is carried out until the resulting CMC has reached the desired residual porosity. Typically, one or several interphases are deposited prior to the matrix to ensure that the composite fails in a non-brittle manner.

During chemical vapor infiltration or deposition, the diffusion rate of the inflitrant near exterior layers commonly outpaces the diffusion rate of the inflitrant rate of interior layers of the preform structure. This disparity of diffusion rate leads to increased matrix growth formation near exterior layers relative to matrix growth within interior layers. Accordingly, pores of exterior layers close prior to pores of interior layers, leading to voids within the component. Internal voids within a ceramic matrix composite (CMC) component can lead to decreased interlaminar properties.

To account for this difference in matrix growth rate, the average inter-tow pore size gradient increases from interior layers towards exterior layers. By providing larger inter-tow pore sizes at the exterior surfaces relative to interior inter-tow pore sizes, the disparity between the time of diffusion of the infiltrant to the most interior ply layers of the preform structure and the time of diffusion of the infiltrant to the most exterior layers is compensated by the inter-tow pore size gradient. As such, the presence of voids within the preform structure is greatly reduced, leading to improved interlaminar tensile strength and interlaminar shear strength properties. Additionally, reducing the presence of interior voids increases the density of the ceramic matrix composite (CMC) component.

At step 224, various post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein.

Discussion of Possible Embodiments

The following are non-exclusive descriptions of possible embodiments of the present invention.

A method of preparing a ceramic fabric for use in a ceramic matrix composite includes, among other possible steps, transforming a first ceramic tow from a first tow geometry to a second tow geometry, thereby reducing a first dimension of the first ceramic tow and increasing a second dimension of the first ceramic tow orthogonal to the first dimension to produce a first flattened ceramic tow. The method further includes weaving or braiding the first flattened tow to form a first ceramic fabric and weaving or braiding a second ceramic tow having the first tow geometry to form a second ceramic fabric. The method further includes separating the first ceramic fabric to form at least one first ply and separating the second ceramic fabric to form at least on second ply. The method includes laying up the first ply and the second ply to form a preform structure.

The method of the preceding paragraph can optionally include, additionally and/or alternatively, any one or more of the following features, configurations, additional components, and/or steps.

A further embodiment of the foregoing method, wherein the first ply can be arranged interior of the second ply of the preform structure.

A further embodiment of any of the foregoing methods, wherein the first ceramic fabric can include silicon carbide tows.

A further embodiment of any of the foregoing methods, wherein the second ceramic fabric can include silicon carbide tows.

A further embodiment of any of the foregoing methods can include transforming a third ceramic tow from the first tow geometry to a third tow geometry, thereby reducing a third dimension of the third ceramic tow and increasing a fourth dimension of the third ceramic tow orthogonal to the third dimension to produce a second flattened ceramic tow.

A further embodiment of any of the foregoing methods, wherein the third dimension of the second flattened ceramic tow is less than the first dimension of the first ceramic tow.

A further embodiment of any of the foregoing methods can include weaving or braiding the second flattened ceramic tow to form a third ceramic fabric.

A further embodiment of any of the foregoing methods can include separating the third ceramic fabric into at least on third ply.

A further embodiment of any of the foregoing methods can include laying up the first ply, the second ply, and the third ply to form the preform structure.

A further embodiment of any of the foregoing methods, wherein transforming the first ceramic tow to the second tow geometry and transforming the third ceramic tow to the third tow geometry includes applying a first pressure to opposite sides of the first ceramic tow and applying a second pressure to the third ceramic tow.

A further embodiment of any of the foregoing methods, wherein the first pressure is different than the second pressure.

A further embodiment of any of the foregoing methods, wherein the first ply and the third ply can be arranged exterior to the second ply.

A further embodiment of any of the foregoing methods, wherein the third ply can be exterior to the first ply.

A further embodiment of any of the foregoing methods, wherein a first average inter-tow pore size of the first ply is less than a second average inter-tow pore size of the second ply.

A further embodiment of any of the foregoing methods, wherein a third average inter-tow pore size of the third ply is less than the first average inter-tow pore size.

A further embodiment of any of the foregoing methods, wherein the first average inter-tow pore size of the first ply can be less than the second average inter-tow pore size of the second ply.

A further embodiment of any of the foregoing methods, wherein a third average inter-tow pore size of the third ply can be less than the first average inter-tow pore size.

A further embodiment of any of the foregoing methods, wherein the first average inter-tow pore size of the first ply can be 10% or less of an average center-to-center spacing of the first ceramic tows in the first ply.

A further embodiment of any of the foregoing methods, wherein the third average inter-tow pore size of the third ply can be less than 35% and greater than 10% of an average center-to-center spacing of the third ceramic tows in the third ply.

A further embodiment of any of the foregoing methods, wherein the first average inter-tow pore size and the third average inter-tow pore size are at least 50 microns.

A further embodiment of any of the foregoing methods can include densifying the preform structure using a chemical vapor infiltration process.

Another method of preparing a ceramic fabric for use in a ceramic matrix composite includes, among other possible steps, weaving or braiding a plurality of first ceramic tows to form a first ceramic fabric, an average first inter-tow pore size that is between 30% and 55% of an average center-to-center spacing of the first ceramic tows. The method includes weaving or braiding a plurality of second ceramic tows to form a second ceramic fabric, an average second inter-tow pore size that is between 30% and 55% of an average center-to-center spacing of the second ceramic tows. The method includes transforming the first ceramic fabric from the first average inter-tow pore size to a third average inter-tow pore size by applying a first pressure to opposite sides of the first ceramic fabric. The third average inter-tow pore size is less than 30% of the average center-to-center spacing of the first ceramic tows. The method includes separating the first ceramic fabric into at least one first ply after transforming the first ceramic fabric and separating the second ceramic fabric into at least one second ply. The method includes laying up the first ply and the second ply to form a preform structure.

The method of the preceding paragraph can optionally include, additionally and/or alternatively, any one or more of the following features, configurations, additional components, and/or steps.

A further embodiment of the foregoing method, wherein the first ply can be arranged interior of the second ply of the preform structure.

A further embodiment of any of the foregoing methods, wherein the first ceramic fabric comprises silicon carbide tows.

A further embodiment of any of the foregoing methods, wherein the second ceramic fabric comprises silicon carbide tows.

A further embodiment of any of the foregoing methods can include weaving or braiding a plurality of third ceramic tows to form a third ceramic fabric, an average fourth inter-tow pore size that is between 30% and 55% of an average center-to-center spacing of the third ceramic tows.

A further embodiment of any of the foregoing methods can include transforming the third ceramic fabric from the fourth average inter-tow pore size to a fifth average inter-tow pore size by applying a second pressure to opposite sides of the third ceramic fabric different than the first pressure.

A further embodiment of any of the foregoing methods, wherein the fifth average inter-tow pore size can be less than 10% of an average center-to-center spacing of the third ceramic tows.

A further embodiment of any of the foregoing methods, wherein the fourth average inter-tow pore size can be greater than 10% of the average center-to-center spacing of the first ceramic tows.

A further embodiment of any of the foregoing methods can include laying up the first ply, the second ply, and the third ply to form the preform structure.

A further embodiment of any of the foregoing methods, wherein the first ply and the third ply can be arranged interior to the second ply.

A further embodiment of any of the foregoing methods, wherein the third ply can be interior to the first ply.

A further embodiment of any of the foregoing methods, wherein the third average inter-tow pore size and the fifth average inter-tow pore size can be at least 50 microns, respectively.

A further embodiment of any of the foregoing methods can include densifying the preform structure using a chemical vapor infiltration process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preparing a ceramic fabric for use in a ceramic matrix composite, the method comprising:
    transforming a first ceramic tow from a first tow geometry to a second tow geometry, thereby reducing a first dimension of the first ceramic tow and increasing a second dimension of the first ceramic tow orthogonal to the first dimension to produce a first flattened ceramic tow;
    weaving or braiding the first flattened ceramic tow to form a first ceramic fabric;
    weaving or braiding a second ceramic tow to form a second ceramic fabric;
    separating the first ceramic fabric into multiple plies including at least one first ply;
    separating the second ceramic fabric into multiple plies including at least one second ply; and
    laying up the first ply and the second ply to form a preform structure.

2. The method of claim 1, wherein the first ply is arranged interior of the second ply of the preform structure.

3. The method of claim 1, further comprising:
    transforming a third ceramic tow from the first tow geometry to a third tow geometry, thereby reducing a third dimension of the third ceramic tow and increasing a fourth dimension of the third ceramic tow orthogonal to the third dimension to produce a second flattened ceramic tow, wherein the third dimension of the third ceramic tow is less than the first dimension of the first ceramic tow;
    weaving or braiding the second flattened ceramic tow to form a third ceramic fabric;

separating the third ceramic fabric into at least one third ply; and laying up the first ply, the second ply, and the third ply to form the preform structure.

4. The method of claim 3, wherein transforming the first ceramic tow to the second tow geometry and transforming the third ceramic tow to the third tow geometry includes applying a first pressure to opposite sides of the first ceramic tow and applying a second pressure to the third ceramic tow, the second pressure different than the first pressure.

5. The method of claim 3, wherein a first planar porosity of the first ply is less than a second planar porosity of the second ply, and wherein a third planar porosity of the third ply is less than the first planar porosity.

6. The method of claim 3, wherein:

the first ply and the third ply are arranged interior to the second ply; and the third ply is interior to the first ply.

7. The method of claim 5, wherein the third planar porosity of the third ply is greater than 0.2% and less than or equal to 10%.

8. The method of claim 7, wherein the first planar porosity of the first ply is less than or equal to 25% and greater than 1.4%.

9. The method of claim 3, wherein the first average inter-tow pore size and the third average inter-tow pore size are at least 50 microns respectively.

10. The method of claim 3, further comprising:

densifying the preform structure using a chemical vapor infiltration process, a polymer infiltration and pyrolysis process, or a melt infiltration process.

11. A method of preparing a ceramic fabric for use in a ceramic matrix composite, the method comprising:

weaving or braiding a plurality of first ceramic tows to form a first ceramic fabric having a first planar porosity;

weaving or braiding a plurality of second ceramic tows to form a second ceramic fabric having a second planar porosity;

transforming the first ceramic fabric from the first planar porosity to a third planar porosity by applying a first pressure to opposite sides of the first ceramic fabric, wherein the third planar porosity is less than the first planar porosity;

separating the first ceramic fabric into at least one first ply after transforming the first ceramic fabric;

separating the second ceramic fabric into at least one second ply; and laying up the first ply and the second ply to form a preform structure.

12. The method of claim 11, wherein the first ply is arranged interior of the second ply of the preform structure.

13. The method of claim 11, further comprising:

weaving or braiding a plurality of third ceramic tows to form a third ceramic fabric having a fourth planar porosity;

transforming the third ceramic fabric from the fourth planar porosity to a fifth planar porosity by applying a second pressure to opposite sides of the third ceramic fabric different than the first pressure, wherein the fifth planar porosity is less than the fourth planar porosity and the third planar porosity of the first ceramic fabric; and laying up the first ply, the second ply, and the third ply to form the preform structure.

14. The method of claim 13, wherein:

the first ply and the third ply are arranged interior to the second ply; and the third ply is interior to the first ply.

15. The method of claim 13, further comprising:

densifying the preform structure using a chemical vapor infiltration process, a polymer infiltration and pyrolysis process, or a melt infiltration process.

* * * * *